(12) United States Patent
Lausenhammer et al.

(10) Patent No.: US 7,306,452 B2
(45) Date of Patent: Dec. 11, 2007

(54) COOLING SYSTEM FOR SLEEVES THAT ARE FIXED TO A CARRIER PLATE

(75) Inventors: Manfred Lausenhammer, Konz-Niedermennig (DE); Helmut Thömmes, Kastel (DE)

(73) Assignee: MHT Mold & Hotrunner Technology AG, Hochheim (DE)

( * ) Notice: Subject to any disclaimer, the term of this patent is extended or adjusted under 35 U.S.C. 154(b) by 452 days.

(21) Appl. No.: 10/506,706

(22) PCT Filed: Feb. 12, 2003

(86) PCT No.: PCT/DE03/00397

§ 371 (c)(1),
(2), (4) Date: Mar. 11, 2005

(87) PCT Pub. No.: WO03/076164

PCT Pub. Date: Sep. 18, 2003

(65) Prior Publication Data

US 2005/0161860 A1 Jul. 28, 2005

(30) Foreign Application Priority Data

Mar. 9, 2002 (DE) ................. 102 10 456

(51) Int. Cl.
*B29C 45/72* (2006.01)

(52) U.S. Cl. ............... 425/547; 425/526; 425/534

(58) Field of Classification Search ........... 425/547, 425/526, 534
See application file for complete search history.

(56) References Cited

U.S. PATENT DOCUMENTS 5,725,891 A * 3/1998 Reid, Jr. .............. 425/407

FOREIGN PATENT DOCUMENTS

| EP | 0718084 A2 | 6/1996 |
|----|------------|--------|
| EP | 0283644 B2 | 10/1996 |
| EP | 0937566 B1 | 2/2003 |

* cited by examiner

*Primary Examiner*—Robert B. Davis
*Assistant Examiner*—Marissa W Chaet
(74) *Attorney, Agent, or Firm*—Michael L. Dunn (57) ABSTRACT

A cooling system for cooling sleeves (2) fixed to a carrier plate (1), by means of a fluid which is passed from a fluid inlet (15) to a fluid outlet (22) by way of fluid conduits (7, 14, 10, 11, 21) supported by means of the carrier plate (1). The fluid conduits (7, 14, 10, 11, 21) include main supply conduits (7) and supply conduits (10, 11) which extend approximately transversely with respect to each other. The supply conduits extend in a mutually parallel relationship and are arranged in pairs in the carrier plate (1) and are connected to a row of sleeves (2) by way of intake (16) and discharge conduits (17). The row of sleeves (2) is so disposed between the supply conduits (10, 11) of a pair such that each sleeve (2) is connected to both supply conduits (10, 11), and fluid communication is interrupted (plug 24) in at least the one supply conduit (10) of the pair substantially at the middle of its longitudinal extent (l).

7 Claims, 6 Drawing Sheets

COOLING SYSTEM FOR SLEEVES THAT ARE FIXED TO A CARRIER PLATE

BACKGROUND OF THE INVENTION

The invention concerns a cooling system for cooling sleeves fixed to a carrier plate, by means of a fluid which is passed from a fluid inlet to a fluid outlet by way of fluid conduits supported by means of the carrier plate, wherein belonging to the fluid conduits are main supply conduits and supply conduits which extend approximately transversely with respect thereto, the latter supply conduits extending in mutually parallel relationship and arranged in pairs in the carrier plate and being connected to a row of sleeves by way of intake and discharge conduits, wherein the row of sleeves is so disposed between the supply conduits of a pair that each sleeve is connected to both supply conduits.

It is known for drinking water to be supplied to the end consumer in bottles comprising more or less transparent plastic material, in particular PET. As is known those PET bottles are blow-moulded from preforms which in turn are injection moulded from polyethylene terephthalate (PET). The PET bottles and correspondingly the preforms of PET are required in large numbers and are produced using correspondingly powerful machines. After the injection moulding procedure the preforms have to be sufficiently cooled in order to permit processing thereof after the injection moulding procedure without damage to the preforms.

In known injection moulding machines the cooling operation is effected by way of sleeves which are fixed to a carrier plate in large numbers. Such tools are known for example from EP-B2-0 283 644. In practice the fluid used is cooling water which is fed to each sleeve by way of intake conduits and which after the cooling operation, in the region of the sleeve, is discharged therefrom again by way of discharge conduits.

So that cooling of a large number of sleeves can be carried out simultaneously in a machine which is as compact as possible, carrier plates have been developed, having a plurality of sleeves secured thereto, with fluid conduits extending in the carrier plate in order to pass the cooling fluid, preferably cooling water, from a fluid inlet for the entire carrier plate, in parallel relationship and more or less at the same time to the sleeves through which the fluid flows for the cooling operation, and to take the fluid out of the sleeves again to a fluid outlet.

Known cooling systems however suffer from serious disadvantages. Although the cooling conduits in the individual sleeves and thus also the intake and discharge conduits at the sleeves are of a small cross-section, nonetheless the individual conduit cross-sections add up considerably when there is a relatively large number of sleeves through which fluid is to flow at the same time. In the case of a known carrier plate of for example 144 sleeves, the surface area which is to be supplied with cooling fluid is about 1,800 mm². In comparison with that consumption surface area there is cross-sectional area of only about 500 mm² at the fluid inlet. The area which is to be supplied with fluid at the sleeves is therefore disadvantageously about four times as great as the available entry area for the cooling fluid. That signifies a severe pressure drop from the fluid inlet to the sleeve outlet and in the region of the sleeves there is scarcely still any turbulence, due to the flow speeds being lower as a result of that pressure drop. In the absence of turbulence however the cooling action also falls severely. At the same time the carrier plate may suffer from the disadvantage of flooding because impurities settle in the fluid conduits due to the slow flow and the low pressure and are not flushed away. The transfer of heat between the fluid inlet and the fluid outlet is reduced, as a further disadvantage.

BRIEF DESCRIPTION OF THE INVENTION

An object of the present invention is to improve the known cooling system for cooling the sleeves secured to the carrier plate, in accordance with the features of the kind set forth in the opening part of this specification, in such a way that, with an increase in the fluid turbulence phenomena, while reducing the throttle effect, greater flow speeds, a lesser danger of contamination and a greater level of cooling efficiency are achieved.

In accordance with the invention that object is attained in that the fluid communication is interrupted in at least the one supply conduit of the pair substantially at the middle of its longitudinal extent. In other words the possibility of a fluid flowing through the supply conduit is blocked. The effect is the same as if two supply conduits of approximately equal size are provided one after the other.

More particularly, a cooling system is provided for cooling sleeves (2) fixed to a carrier plate (1), by means of a fluid which is passed from a fluid inlet (15) to a fluid outlet (22) by way of fluid conduits (7, 14, 10, 11, 21) supported by means of the carrier plate (1). The fluid conduits (7, 14, 10, 11, 21) include main supply conduits (7) and supply conduits (10, 11) which extend approximately transversely with respect to each other. The supply conduits extend in a mutually parallel relationship and are arranged in pairs in the carrier plate (1) and are connected to a row of sleeves (2) by way of intake (16) and discharge conduits (17). The row of sleeves (2) is so disposed between the supply conduits (10, 11) of a pair such that each sleeve (2) is connected to both supply conduits (10, 11), and fluid communication is interrupted (plug 24) in at least the one supply conduit (10) of the pair substantially at the middle of its longitudinal extent (l).

DETAILED DESCRIPTION OF THE INVENTION

A block or barrier only needs to be provided at the location of the supply conduit, at which the fluid communication is to be interrupted, in order to make two supply conduits out of the one supply conduit, without the necessity for mechanical/physical changes in the structure of the carrier plate. By dividing the at least one supply conduit of the pair of supply conduits into two, the originally single flow path is subdivided into two sections for the flow pattern of that pair of supply conduits.

The sleeves (cooling sleeves) are arranged between the two supply conduits of a pair, which extend in mutually parallel relationship, in such a way that there is fluid communication from the one supply conduit by way of the sleeve to the other. That applies for all sleeves. In regard to the flow path for the fluid, this signifies that the fluid flows out of the one supply conduit by way of the sleeve into the other. In the known situation there is no interruption in the fluid communication so that the incoming cooling water always looks for the easiest way of lowest resistance from the one supply conduit to the other so that it flows through and cools only those sleeves in which the flow resistance is sufficiently low. Due to the impurities which settle in the known carrier plate ever increasing flow resistances can progressively build up with the result that it is no longer possible for the fluid to flow through all sleeves in the desired manner to attain a cooling effect.

If in accordance with the invention at least the one supply conduit allows the fresh fluid to flow in out of the fluid outlet only in the first section as far as the interruption, this gives the advantage that the fluid is forced to look for the communicating paths to the adjacent supply conduit of the pair (more specifically, by way of the sleeves), to flow through that communicating path and thus to prevent contamination.

Having arrived in the other parallel supply conduit, it is then only in the second section ("downstream"—in the flow direction—of the interruption in the fluid communication), by way of the above-mentioned intake and discharge conduits, that the fluid can then find flow paths by way of the sleeves to the fluid outlet. Here too the fluid is forced to flow in the region of the second section into the one supply conduit with the fluid interruption. That affords a lower pressure drop in the fluid conduits or—in other words—a lower level of throttle effect. Due to the greater flow speeds which occur as a result, there is less of a danger of contamination or indeed a risk of blockage, with the consequence that ultimately a considerably greater level of cooling efficiency is achieved.

In a further advantageous configuration of the invention, to provide an even better structure, it is provided that, in addition to the first interruption in the one supply conduit of the pair, in the other supply conduit of the pair also the fluid communication is interrupted at two locations which are respectively in opposite relationship to the centre of the longitudinal extent of the remaining conduit. The "remaining conduit" is the shortened supply conduit with the interruption. If for example there is an interruption in the fluid communication only approximately at the centre of the one supply conduit of the pair, then that involves two remaining conduits, namely—as viewed in the flow direction—upstream and downstream of the interruption. Two parallel supply conduits are to be found in each pair. If the one supply conduit is divided into two halves by the interruption in the flow communication, that affords the two remaining conduits which are each of a given lengthwise extent, namely half the length of the original supply conduit (without interruption). Then, arranged in the region of that centre of the remaining conduit, in the adjacent parallel supply conduit, is said location at which the fluid communication is interrupted. The last-mentioned supply conduit then has two interruptions; the first-mentioned one in that pair of supply conduits which is being considered has only one interruption. Nonetheless that pair of supply conduits is subdivided into four sections.

The simplicity of the structural means of the cooling system according to the invention is impressive. More specifically, according to the invention, the means for interrupting the fluid communication is a plug. It is apparent to the man skilled in the art that a supply conduit can be provided with such a plug at virtually any location on its extent, with the consequence that any flow communication in the supply conduit considered is prevented by the plug at that location. The plug is so-to-speak a 100% barrier or block. Plugs can be of differing structures, for example they can be of an elastomeric material or only partially of an elastomeric material with in addition a hard and resistant material, for example steel. There are admittedly also plugs which are formed entirely from metal and with which the one end of the supply conduit, being an end which is open for production procedure reasons, is already blocked in the known carrier plates. For the plugs provided in the region of the longitudinal extent of the supply conduit however it is preferable to use a combination of steel and rubber which, as is known, can be firmly joined together. More specifically, in the case of a known carrier plate, the supply conduits are let into same by virtue of the one so-called deep hole bore being produced from a narrow side of the carrier plate over the entire width of the plate almost as far as the opposite end, being therefore a deep blind bore. In parallel relationship therewith, a further deep hole bore is produced at such a spacing that a cooling sleeve has space therebetween and can be arranged in such a way that an intake conduit of the sleeve opens directly at the edge of the one deep hole bore (supply conduit) and the discharge conduit opens at the same level into the adjacent deep hole bore (supply conduit). Then, many intake and discharge conduits can be provided in the form of small bores over the entire width of the carrier plate so that a whole row of sleeves can be arranged in the described manner, distributed over the width of the carrier plate.

That provides the features according to the invention, that the pairs of supply conduits extend over virtually the entire width of the carrier plate and a respective supply conduit of a pair is in fluid communication with a respective main supply conduit disposed in a distributor beside the carrier plate. That so-called distributor serves for distributing the fluid. It is desirably arranged beside the carrier plate and preferably on the flat, preferably even underside thereof. It is then possible to dispose in the distributor main supply conduits which are of a larger flow cross-section and which can serve for supplying a plurality of supply conduits. In that case also it is possible to provide a short communication from the respective main supply conduit to the supply conduits. Therefore, of each pair of supply conduits, a supply conduit is in fluid communication with a main supply conduit. In other words, that arrangement provides that at the intake side fluid flows from the inlet by way of the main supply conduit into a plurality of supply conduits which are disposed in pairs, namely through the one supply conduit by way of the sleeve to the other and by way of the other supply conduit to the fluid outlet. Likewise, provided at the outlet side is a main supply conduit and this collects the outgoing fluid (after the cooling operation) for jointly passing it away into the discharge conduit.

Described hereinbefore was the one embodiment in which, in a respective pair of supply conduits, there is provided only one interruption in the fluid communication, by means of a plug; the second embodiment was also described as being particularly preferred in which, in addition to the one interruption, interruptions are also achieved by plugs in the oppositely disposed supply conduit of the pair, wherein the plugs are each provided at the level of the centre of the remaining conduit. The four sections attained by virtue of that arrangement were described.

Now however more sections may also be wanted, by virtue of even more plugs used, in the context of the available length of the respective supply conduit. Thus for example the one supply conduit can be provided with three plugs and the oppositely disposed supply conduit can be provided with two plugs in such a way that six sections are achieved by virtue of the interruptions formed in the fluid communication. When the supply conduits are of great lengths, that is to say when the carrier plate is of great width, such an embodiment may be appropriate and useful. If in contrast the embodiment selected is one in which twelve sleeves are to be supplied in a row in the region of a pair of supply conduits, this embodiment with the four sections is adequate and highly effective. From one embodiment to another, when using more and more plugs and thereby seeking to provide more and more sections, the number of plugs (interruptions in the fluid communication) rises in each case by an integral multiple. The number A of plugs therefore is in accordance with the rule A=1+2n, wherein n is a number rising from zero, for example up to four or five. For the example n=0 the number of plugs would be one. This is the first embodiment as described hereinbefore, in which in only one supply conduit of each pair there is provided only one interruption in the fluid communication (one plug). For n=1 that gives a number A of three plugs. This is the second embodiment described hereinbefore in which, in addition to the plug in the one supply conduit, there are provided two further plugs in the other supply conduit. This is the embodiment with the four sections produced. In addition for n=2 the embodiment with the five plugs and the six sections is described above. The number S of sections achieved is always 1+A.

Further advantages, features and possible uses of the present invention will be apparent from the description hereinafter of preferred embodiments with reference to the accompanying drawings.

As depicted in the drawings, item numbers are shown as identifying the parts and items below:

1 carrier plate
2 cooling sleeves, sleeves
3 distributor
4 central portion
5 upper portion
6 lower portion
7 main supply conduit
8 frame
9 shaft
10 supply conduit
11 supply conduit
12 vacuum conduit
13 metal plug
14 connecting bore
15 fluid inlet
16 intake conduit
17 discharge conduit
18 spiral
19 intake
20 discharge
21 connecting bore
22 fluid outlet
23 protective case
24 plug
24a plug
24b plug
24c plug
25 plug
25a plug
25b plug
l longitudinal extent
B width of the carrier plate
B/2 height of the carrier plate
R remaining conduit
R1 upper remaining conduit
R2 lower remaining conduit
S1-S6 sections.

Figure 1:
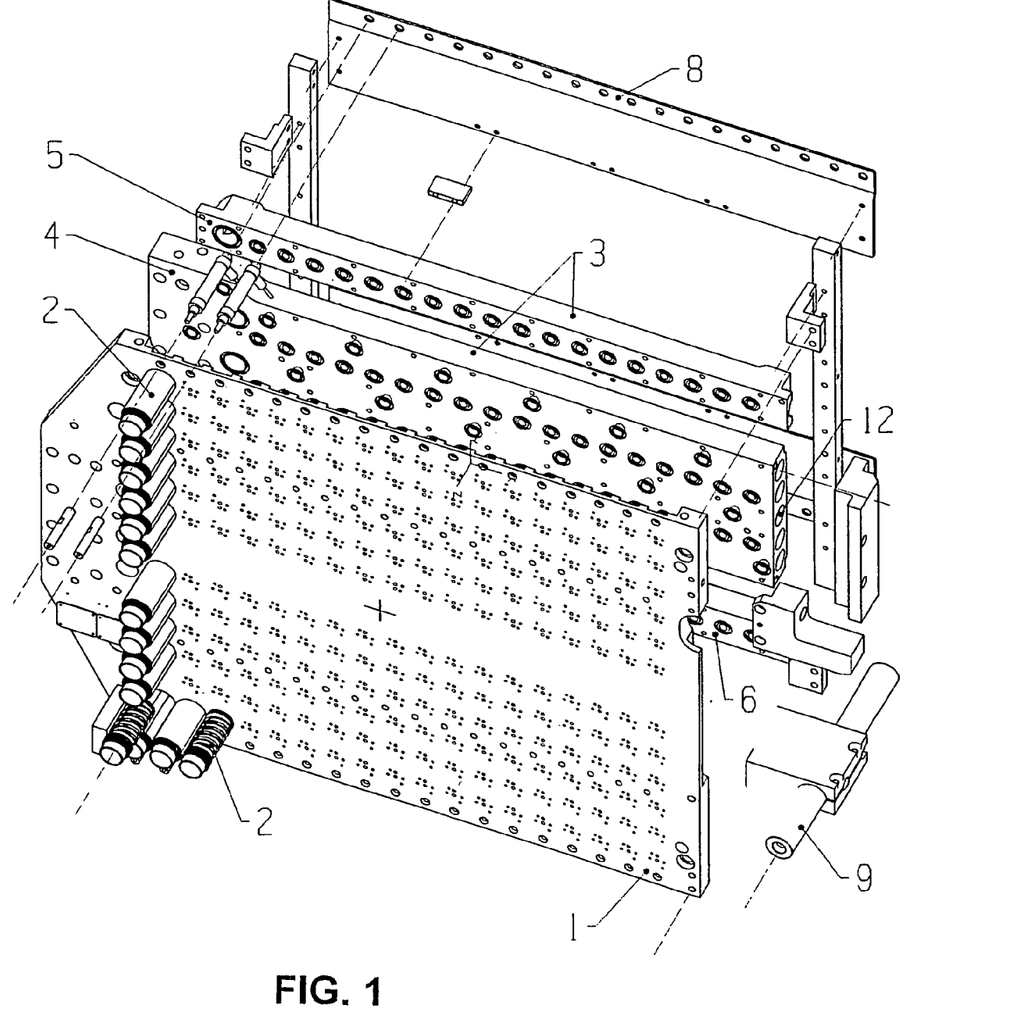
FIG. 1 is a partly broken-away, exploded, perspective view of the carrier plate with distributor and some sleeves which are secured to the carrier plate and which are picked out by way of example.

FIG. 1 shows the overall structure with a carrier plate 1 on which cooling sleeves, referred to hereinafter as sleeves 2, are fixed. Fixed on the flat rear side of the carrier plate 1 is the distributor which is generally identified by reference numeral 3 and the central portion 4 of which passes vacuum conduits 12 which are also not further described herein, and in the upper portion 5 and the lower portion 6 of which there is provided a respective main supply conduit 7. The carrier plate 1 and the distributor 3 with its parts 4-6 are fixed to the frame identified generally by reference numeral 8.

Preferably the carrier plate 1 is disposed vertically so that, it is arranged approximately in the position illustrated in FIG. 1 and the force of gravity acts in a downward direction on the cooling water used as the fluid. The unit consisting of the frame 8 and the carrier plate 1 can be displaced horizontally along the shaft 9.

Figure 2:
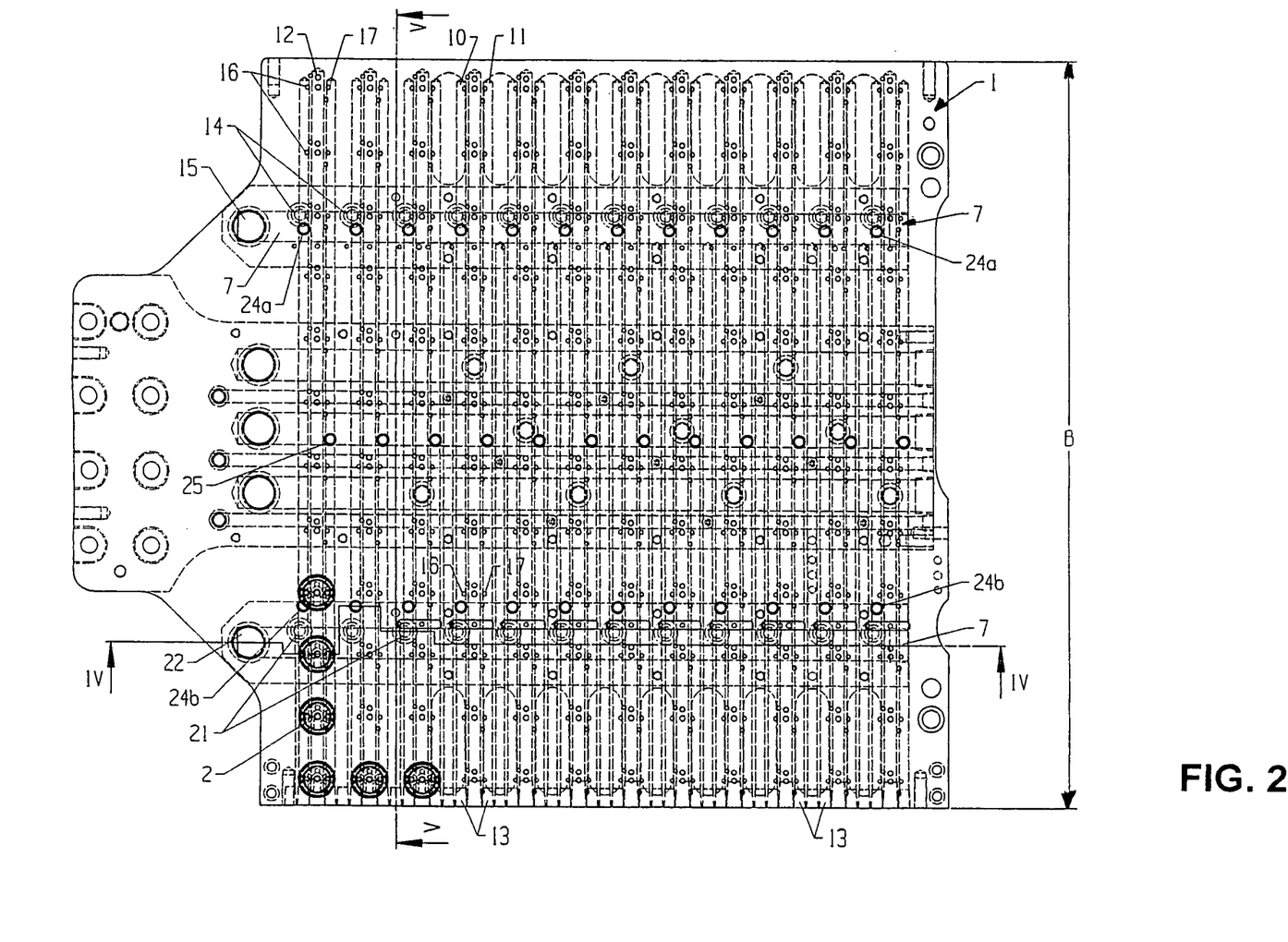
FIG. 2 shows a plan view of the carrier plate when looking from left front to rear right in FIG. 1, with however only six sleeves being indicated.
Figure 3:
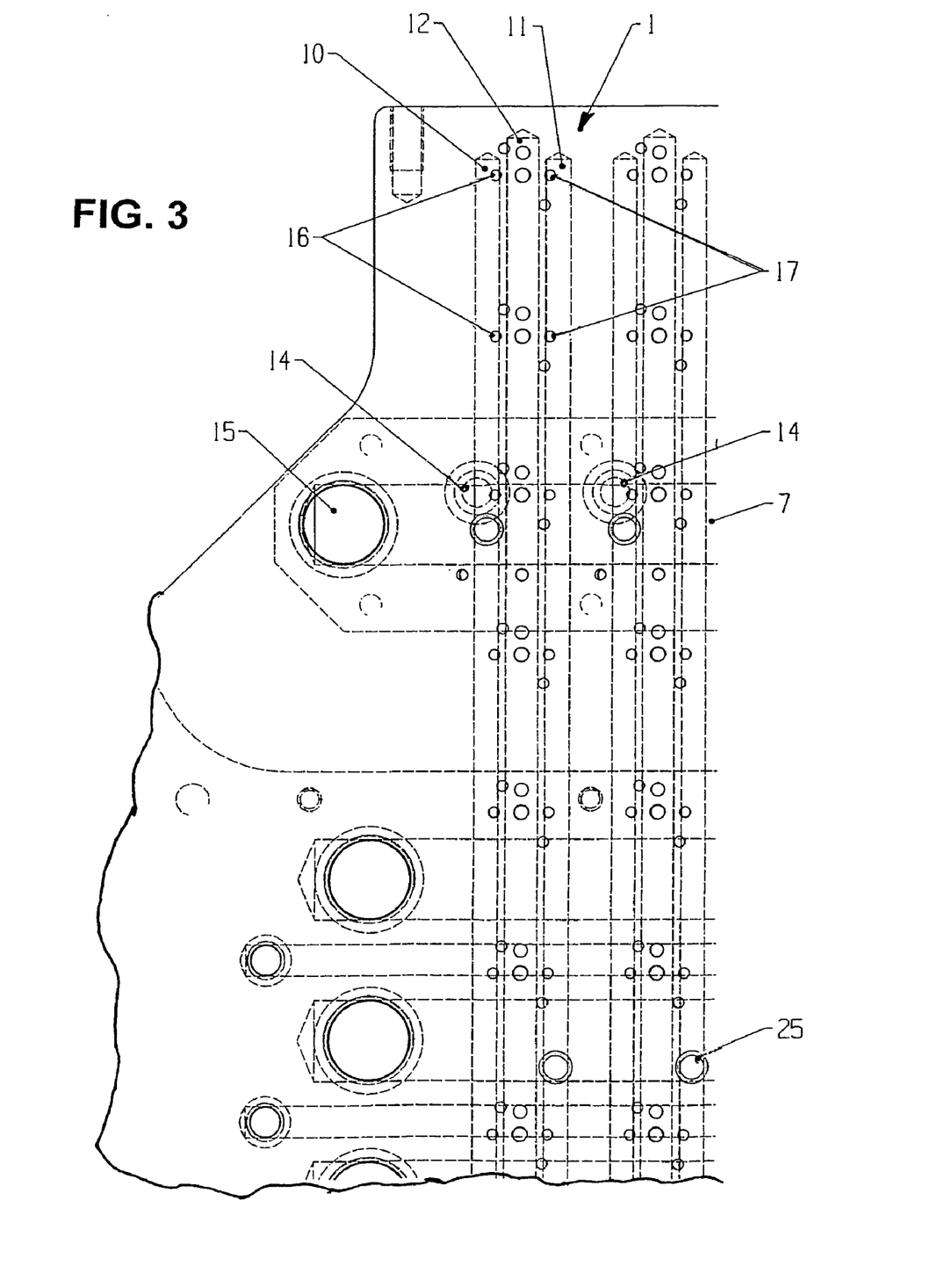
FIG. 3 is a view on an enlarged scale of a portion from the carrier plate in the top left region.

The carrier plate 1 which is shown in the view thereonto in FIG. 2 is of a width B which is approximately also shown in FIG. 1. In the embodiment illustrated here, twelve pairs of supply conduits 10, 11 in the form of deep hole bores are provided over virtually the entire width B of the carrier plate 1. In FIGS. 2 and 3 the closed ends of the supply conduits 10 and 11 are disposed upwardly while in FIG. 2 the open ends are closed at the bottom by metal plugs 13. The supply conduit 10 which is shown at the left in each of FIGS. 2 and 3 is connected by way of the respective connecting bore 14 to the intake-side main supply conduit 7. The latter extends in the longitudinal direction of the carrier plate 1, accordingly horizontally from left to right and vice-versa in FIGS. 2 and 3. The connecting bore 14 of each pair extends from the main supply conduit 7 upwardly in perpendicular relationship to the main plane of the carrier plate 1, as is diagrammatically indicated in FIG. 5, until the respective left supply conduit 10 which extends in the carrier plate 1 is reached. The connecting bore 14 terminates there. The fluid inlet 15 is disposed at the respective left outer end of the main supply conduit 7.

As twelve pairs of supply conduits 10, 11 extend over the length of the carrier plate 1 (from left to right in FIG. 2 or vice-versa), in the region of the main supply conduit 7 there is also a row of twelve connecting bores 14 which are arranged at a spacing in mutually juxtaposed relationship and which provide a fluid communication for all supply conduits 10 with the main supply conduit 7. Disposed at a similarly equal spacing on the carrier plate 1 are the above-mentioned sleeves 2 which by way of intake conduits 16 and discharge conduits 17 make the fluid communication between the supply conduits 10 and 11. The fluid communication by way of the sleeve 2 is shown more clearly in FIG. 4. The cooling water can flow out of the supply conduit 10 by way of the intake conduit 16 in perpendicular relationship to the surface of the carrier plate 1 upwardly into the rising spiral 18 through the intake 19 and then in a spiral form upwardly. The spiral is of a double-flight configuration so that the flow path is changed over at the top from the one spiral into the downwardly passing other spiral as far as the discharge 20 from where the cooling water can flow through the discharge conduit 17 into the other (right-hand) supply conduit 11.

In the state of the art (not shown here) in which there are no plugs and no interruption in the fluid communication, the cooling water, after the cooling operation, flows vertically downwardly along the right-hand supply conduit 11 and—as in the embodiment of the invention illustrated here—passes by way of the discharge conduit 17 (at the bottom in FIG. 2) through the sleeve into the intake conduit 16 and by way of the left-hand supply conduit 10 and the discharge-side connecting bore 21 into the discharge-side main supply conduit 7 (at the bottom in FIG. 2) in order to issue from the fluid outlet 22.

In the state of the art the upper connecting bores 14 on the intake side are connected to a supply conduit, for example the left-hand supply conduit 10, and the lower or discharge-side connecting bores 21 are connected to the respective other, for example right-hand, supply conduit 11. That is admittedly different in the illustrated embodiment of the invention by virtue of the existing subdivision of the fluid flows into four sections, but the physical differences are so slight that many arrangements and dimensions of the invention are the same as the state of the art; thus for example the cross-section of the fluid inlet 15 and the fluid outlet 22. As a result the new carrier plate in accordance with the invention also matches old systems so that old systems can be improved with the novel cooling arrangement.

Figure 4:
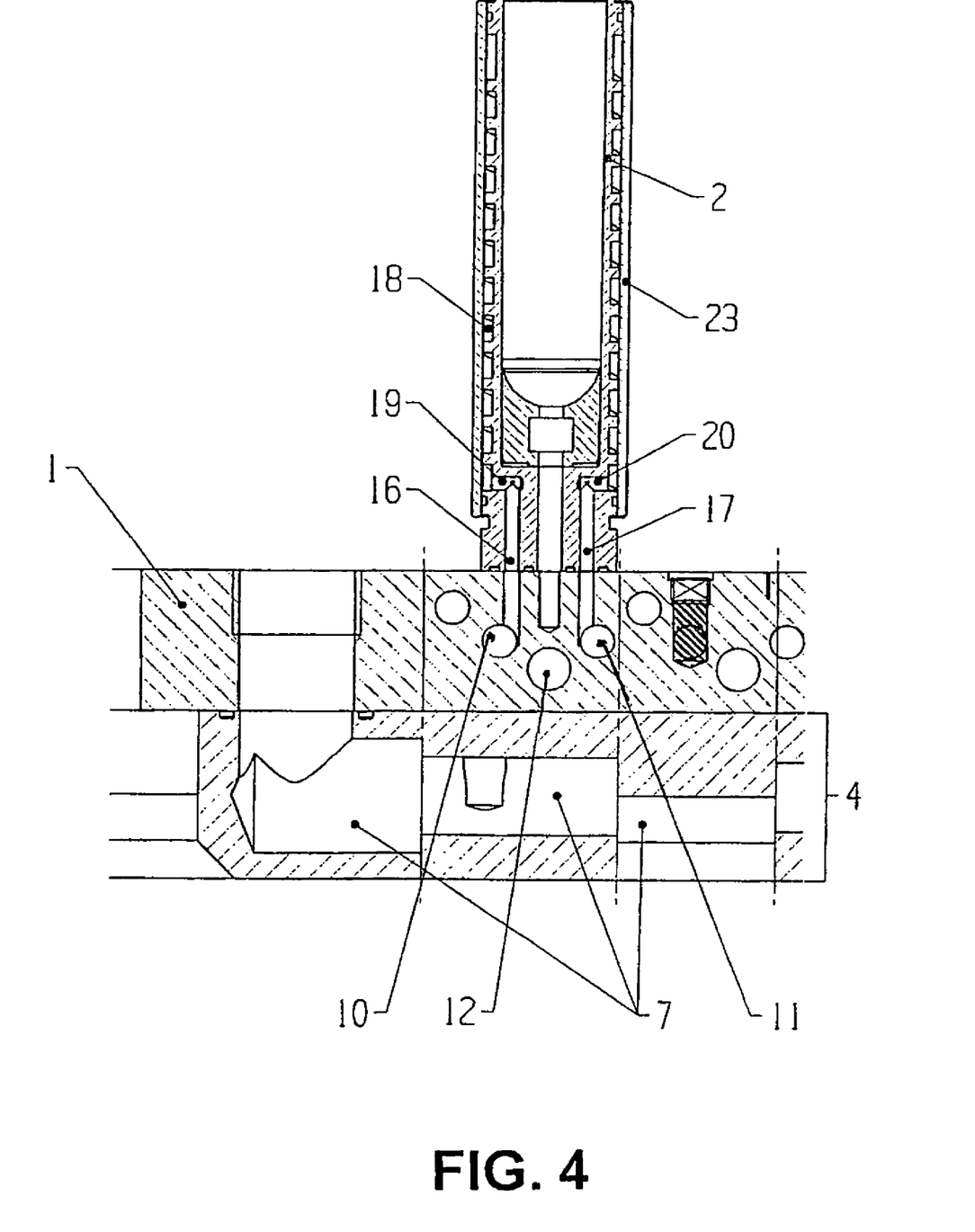
FIG. 4 is a broken-away cross-sectional view through a sleeve, the carrier plate disposed therebeneath and the distributor, along the section line indicated at the left at IV-IV in FIG. 2.
Figure 5:
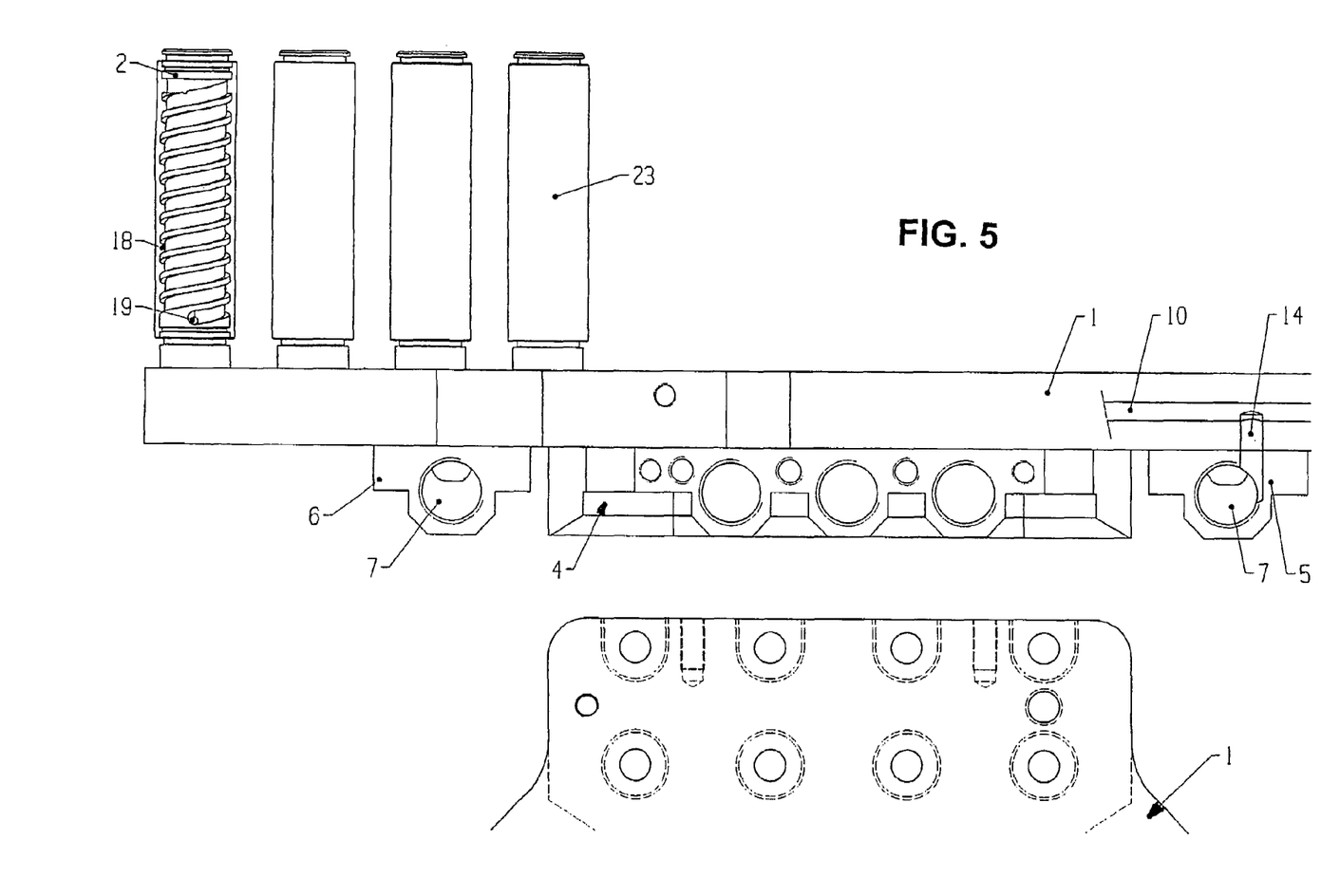
FIG. 5 shows a view of the carrier plate with four fitted sleeves at the left viewing from right to left in the direction of the view in FIG. 2 along the line V-V in FIG. 2.

Disposed around the sleeve 2 with the outwardly open double-flight spiral 18 is a protective casing 23 which can be seen in FIG. 4 and onto which FIG. 5 shows a view from the outside, in the case of the three right-hand sleeves 2.

Figure 6:
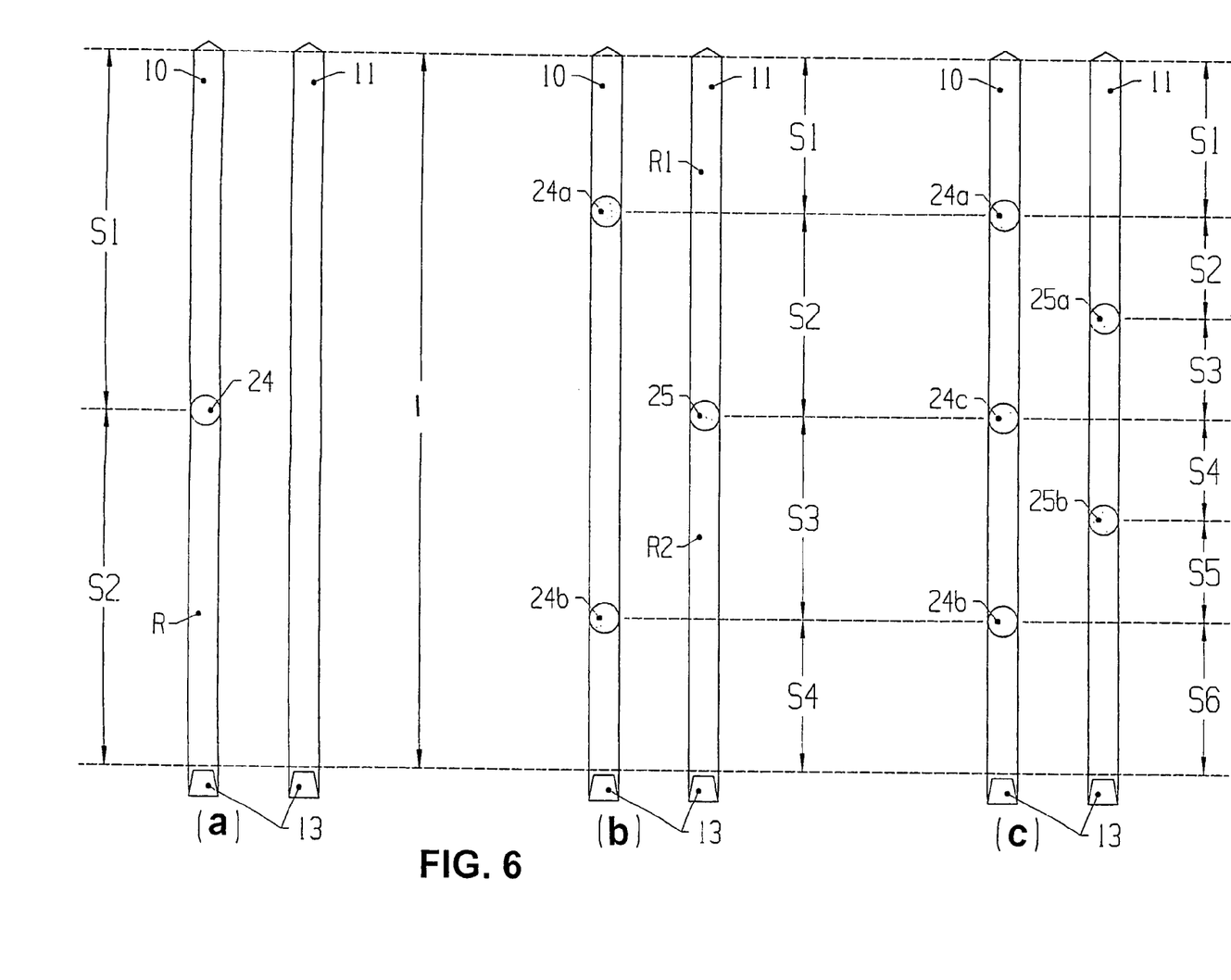
FIG. 6 shows a diagrammatic view of three different pairs of supply conduits with differently fitted plugs and thereby the division of the flow paths into two, four and six sections respectively.

The respective pair of supply conduits 10 and 11 is shown in FIG. 6 for three different embodiments. For the sake of simplifying the drawing the carrier plate 1 is even omitted so that only three pairs of supply conduits 10, 11 are illustrated in the three embodiments (a), (b) and (c). The supply conduits 10, 11 which are in the form of deep hole bores are closed at the top in the Figures by the bore end and are closed at the opposite lower end by the plugs 13. In accordance with the invention in the embodiment (a) in FIG. 6 in the one supply conduit 10 of the pair, which is the left-hand supply conduit, the fluid communication for any flow from above downwardly or vice-versa is interrupted by a plug 24. Each of the supply conduits 10, 11 extends from the upper closed end over a longitudinal extent l as far as the lower end plug 13. That longitudinal extent is almost the same in size as the width B of the carrier plate 1. The centre of that longitudinal extent l is approximately is at half-distance. That centre of the longitudinal extent is disposed in the carrier plate 1 approximately at a height B/2. A line can be notionally drawn at that height over the entire length of the carrier plate 1, an interruption in the fluid communication also being provided at the intersection of that line with other supply conduits, for example the conduit 11 in the embodiment (b) in FIG. 6 and the conduit 10 of the embodiment (c) in FIG. 6.

Firstly reference is made to the embodiment (a) in FIG. 6. Here the interruption is guaranteed by a plug 24 which subdivides the left-hand supply conduit 10 into approximately two halves. As the single connections between the two supply conduits 10 and 11 of each pair is the sleeve 2 connected therebetween or the plurality of sleeves 2 which are connected in mutually parallel relationship, all cooling water which is disposed under pressure for example in the upper half of the supply conduit 10 is forced to flow through the sleeves 2 into the right-hand supply conduit 11. That transverse flow takes place in the section S1. The pressure drop causes the cooling water to flow downwardly in the supply conduit 11 and from there by way of the further interposed sleeves 2 into the remaining conduit, the lower half of the left-hand supply conduit 10. The return flow from right to left into the remaining conduit R takes place in the lower second section S2.

The embodiment (b) diagrammatically shown in FIG. 6 is illustrated in terms of structure in particular in FIG. 1 to 5.

In accordance with the further and particularly preferred embodiment (b) in FIG. 6, in addition to the first interruption (plug 25) in the one, right-hand supply conduit 11 of the pair, the fluid communication is also interrupted in the other supply conduit 10 of the pair, namely the left-hand supply conduit, at two locations (plugs 24a, 24b). If consideration is given to the right-hand supply conduit 11 with the single central interruption by the plug 25, that configuration affords an upper remaining conduit R1 and a lower remaining conduit R2 of approximately equal length. The two meet at the plug 25. The respective locations 24a and 24b at which the fluid communication of the left-hand supply conduit 10 is interrupted is disposed, in opposite relationship to the remaining conduits R1 and R2 respectively, at half the length of the longitudinal extent of the respective remaining conduit. Therefore, a plug 24a is disposed both in the upper region in the conduit 10 and the other plug 24b is also disposed in the lower region. As a result the flow patterns are duplicated in comparison with the embodiment (a) in FIG. 6. In embodiment (b) in FIG. 6 there are therefore four sections S1 to S4.

If it is assumed that the cooling water flows upwardly in the left-hand supply conduit 10, then it changes over into the upper part of the remaining conduit R1 of the right-hand conduit 11 in the section S1. The cooling water flows out of the lower region of the remaining conduit R1 in the region of the section S2 by way of the sleeves (not shown) into the upper region of the central portion of the left-hand supply conduit 10, namely between the plugs 24a and 24b. In the lower region the cooling fluid flows again into the upper portion of the remaining conduit R2 in the section S3 and finally back in the section S4 into the lowermost portion of the supply conduit 10 in order to issue there.

This flow pattern which is diagrammatically illustrated with reference to FIG. 6 and in particular the positions of the plugs 25 and 24a, 24b can be described in more specific detail by means of the detailed example of the embodiment of FIGS. 1 to 5.

Referring to FIGS. 2 and 3 shown therein is the upper row of plugs 24a and at a spacing of two sections once again the lower row of the plugs 24b, which respectively belongs to the left-hand supply conduit 10. As shown in FIG. 2, twelve sleeves are to be envisaged as being arranged in each row and also twelve sleeves are to be envisaged as being arranged in each column (along the supply conduits 10, 11), being a total of 144 sleeves 2. Each sleeve is disposed between the two supply conduits 10 and 11 and provides the flow path from the one conduit 10 to the oppositely disposed conduit 11. In each section three sleeves are disposed one below the other. Cooling water flows through the fluid inlet 15 into the main supply conduit 7 and by way of the connecting bore 14 upwardly into the open region of the supply conduit 10 which is shown furthest at the left in FIG. 3 in order to fill it in the entire section S1. The water which is still cool flows by way of the intake conduits 16 through the three sleeves and passes by way of the discharge conduits 17 into the right-hand supply conduit 111 in the first section S1 at the top and fills it. It will be seen from FIGS. 2 and 3 that after that first cooling operation in the section S2 (still the embodiment (b) in FIG. 6) the cooling water flows by way of the next three sleeves 2 towards the left again into the supply conduit 10 because the plug 25 is disposed at the bottom in FIG. 3 and also in the lower region in FIG. 2, and that plug would not allow the cooling water to further flow in the conduit 11 in a downward direction.

Now, after the cooling water flows downwardly in the supply conduit 10 until reaching a position above the next plug 24b the above condition is practically attained again so that the same flow pattern is now also repeated as described above, in the sections S3 and S4.

In the section S4 the cooling water flows from the right-hand supply conduit 11 into the left-hand supply conduit 10, performing the last cooling operation, and there encounters the discharge-side connecting bore 21 from which the heated cooling water flows by way of the main supply conduit 7 into the fluid outlet 22 and out of same.

In regard to the embodiment (c) in FIG. 6, six sections S1 to S6 are achieved by the arrangement of two plugs 25a and 25b in the right-hand supply conduit 11 and three plugs 24a, 24b and 24c in the left-hand supply conduit 10. The flow pattern is practically the same as in the embodiments (a) and (b) in FIG. 6. In each embodiment of the three embodiments shown for example in FIG. 6 each section is of the same length as the others.

The invention claimed is:

1. A cooling system for cooling sleeves (2) fixed to a carrier plate (1), by means of a fluid which is passed from a fluid inlet (15) to a fluid outlet (22) by way of fluid conduits (7, 14, 10, 11, 21) supported by means of the carrier plate (1), wherein the fluid conduits (7, 14, 10, 11, 21) include main supply conduits (7) and supply conduits (10, 11) which extend approximately transversely with respect to each other, the supply conduits extending in mutually parallel relationship and being arranged in pairs in the carrier plate (1) and being connected to a row of sleeves (2) by way of intake (16) and discharge conduits (17), wherein the row of sleeves (2) is so disposed between the supply conduits (10, 11) of a pair such that each sleeve (2) is connected to both supply conduits (10, 11), wherein fluid communication is interrupted by a plug (24) in at least the one supply conduit (10) of the pair substantially at the middle of its longitudinal extent (l).

2. A cooling system according to claim 1 wherein in addition to the first interruption by a plug (25) in the one supply conduit (11) of the pair fluid communication in the other supply conduit (10) of the pair is also interrupted at two locations by plugs (24a, 24b) which are each respectively in approximately opposite relationship to the centre of the longitudinal extent of the remaining conduits (R1, R2).

3. A cooling system according to claim 1 wherein fluid communication is interrupted by a plug (24).

4. A cooling system according to claim 1 wherein the pairs of the supply conduits (10, 11) extend over almost an entire width (B) of the carrier plate (1) and a respective supply conduit (10, 11) of a pair is in fluid communication with a respective main supply conduit (7) disposed in a distributor (4) beside the carrier plate (1).

5. A cooling system according to claim 2 wherein fluid communication is interrupted by a plug (24).

6. A cooling system according to claim 2 wherein the pairs of the supply conduits (10, 11) extend over almost an entire width (B) of the carrier plate (1) and a respective supply conduit (10, 11) of a pair is in fluid communication with a respective main supply conduit (7) disposed in a distributor (4) beside the carrier plate (1).

7. A cooling system according to claim 4 wherein the pairs of the supply conduits (10, 11) extend over almost an entire width (B) of the carrier plate (1) and a respective supply conduit (10, 11) of a pair is in fluid communication with a respective main supply conduit (7) disposed in a distributor (4) beside the carrier plate (1).

* * * * *